United States Patent

Smith

[11] Patent Number: 6,111,535
[45] Date of Patent: Aug. 29, 2000

[54] METHOD OF MINIMIZING LEAKAGE ENERGY IN A SYNTHETIC APERTURE RADAR PROCESS

[75] Inventor: Brian H. Smith, Ann Arbor, Mich.

[73] Assignee: Veridian ERIM International, Inc., Ann Arbor, Mich.

[21] Appl. No.: 09/138,783

[22] Filed: Aug. 24, 1998

Related U.S. Application Data

[60] Provisional application No. 60/056,438, Aug. 25, 1997.

[51] Int. Cl.[7] .............................. G01S 13/90; G01S 13/00
[52] U.S. Cl. ........................... 342/25; 342/159; 342/175; 342/195
[58] Field of Search .............................. 342/25, 175, 179, 342/192, 193, 194, 195, 196, 197, 159

[56] References Cited

U.S. PATENT DOCUMENTS

| | | | |
|---|---|---|---|
| 5,068,597 | 11/1991 | Silverstein et al. | 342/192 X |
| 5,349,359 | 9/1994 | Dallaire et al. | 342/195 |
| 5,644,314 | 7/1997 | Ahmad et al. | 342/192 X |
| 5,686,922 | 11/1997 | Stankwitz et al. | 342/196 |

*Primary Examiner*—Bernarr E. Gregory
*Attorney, Agent, or Firm*—Gifford, Krass, Groh, Sprinkle, Anderson & Citkowski, PC

[57] ABSTRACT

A method of minimizing leakage energy in a synthetic aperture radar (SAR) system is based a Lagrangian function constructed from image-domain magnitude, and a "penalty function" based upon the choice of aperture. Broadly, the choice of penalty function is related to an estimate of undesirable energy lying outside of the main lobe of the impulse response introduced by the given aperture. Since there are no non-analytic constraints, the output image is purely an analytic function of the input, resulting in a more straightforward analysis and implementation while lessening the likelihood of pseudo-random phenomena. A tunable relative coefficient between the sidelobe energy estimate and the output magnitude allows control over a physically well-understood tradeoff between clutter contrast and point resolution. The generality of the technique may be extended to a multi-parameter minimization with possible applications in super-resolution, gap-filling, interferometry, and ultrasonic imaging, and ATR.

21 Claims, 1 Drawing Sheet

METHOD OF MINIMIZING LEAKAGE ENERGY IN A SYNTHETIC APERTURE RADAR PROCESS

REFERENCE TO RELATED APPLICATION

This application claims priority of U.S. provisional application Ser. No. 60/056,438, filed Aug. 25, 1997, the entire contents of which are incorporated herein by reference.

FIELD OF THE INVENTION

This invention relates generally to remote sensing and, in particular, to a method which optimizes the tradeoff between resolution and sidelobe artifacts in synthetic aperture radar (SAR) and related applications.

BACKGROUND OF THE INVENTION

The band limited nature of SAR data manifests itself in the form of two annoying phenomena: resolution limitation and "sidelobe" ringing, a manifestation of Gibb's phenomena. Most traditional attempts to control the former tend to exacerbate the latter. This results in the classic trade off between sidelobe energy levels and maximum resolution. Spatially variant apodization (SVA) and super-SVA represent approaches to this problem, as described in U.S. Pat. Nos. 5,349,359 and 5,686,922, both of which are incorporated herein in their entirety by reference. The SVA algorithm has been very successful in circumventing this trade off by using a spatially varying aperture function that minimizes the output energy.

In practice, at any given point in the image domain, there exists a frequency domain weighting function which corresponds to zero output energy at that given point (in fact, there exist many such weighting functions). If no constraints are imposed, the minimal output of such a spatially variant frequency domain aperture will tend to zero. In SVA, the minimization is regularized by imposing constraints on the allowed weighting functions, namely the frequency domain weighting functions are restricted to the cosine on pedestal family of functions, with the coefficient of the cosine being constrained to the range between 0 and 1. The choice of the cosine on pedestal family of functions is partially one of computational convenience; they can be efficiently on integer Nyquist sampled data by means of a three point convolver. The constraint on the coefficient of the cosine function ($0 \leq \omega \leq 1$) restricts the aperture to a classic set of weighting functions that have low energy in the sidelobe regions.

SUMMARY OF THE INVENTION

The present invention resides in an alternate regularization scheme. Instead of minimizing the output magnitude subject to external constraints, we minimize a Lagrangian function constructed from the image domain magnitude and a "penalty function," which is based on the choice of aperture. The philosophy behind the choice of penalty function is to relate it to the a priori estimate of "bad" energy (energy outside of the main lobe of the IPR) introduced by a given aperture. The choice of aperture is regulated by the trade off between minimum magnitude output and minimum theoretical sidelobe energy. Since this energy is an estimate of the "leakage" energy between nearby bins, we call this technique leakage energy minimization (LEM).

Broadly, according to a method aspect of the invention, the preferred steps used in implementing an LEM based apodization algorithm are as follows:

Choose and parameterize a set of computationally efficient aperture functions;

Impose holonomic constraints to enforce symmetries and normalization conditions;

Construct a potential that provides an estimate of the leakage energy as a function of the aperture parameters;

At every sampled point in the image domain, calculate the values of the aperture parameters that minimize the Lagrangian in equation (1); and The LEM output at any point is given by the output of the optimized aperture.

The advantages of LEM are several fold. Since there are no nonanalytic constraints, the output image is purely an analytic function of the input. This makes for easier analysis/implementation and lessens the likelihood of pseudo random phenomena, such as the "fog" that appears with some SVA algorithms. A tunable relative coefficient between the sidelobe energy estimate and the output magnitude allows control over a physically well understood trade off between clutter contrast and point resolution. The generality of the formalism can easily be extended to a multi-parameter minimization with possible applications in super resolution, gap filling, interferometry, and ATR.

DETAILED DESCRIPTION OF THE PREFERRED INVENTION

Figure 1:
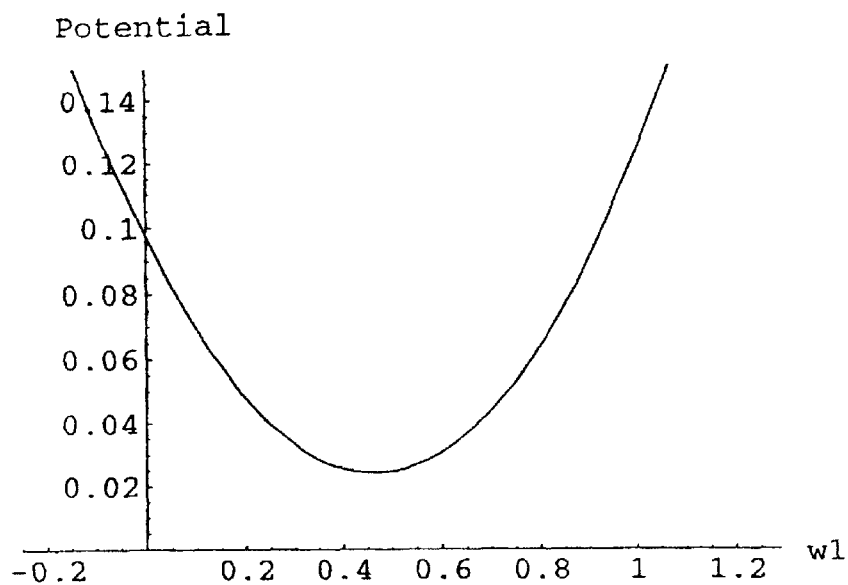
FIG. 1 is a plot of potential as a function of parameter $\omega_1$ which illustrates a minimum potential corresponding to a moderate cosine-on-pedestal weighting function.

As discussed above, the instant invention minimizes a Lagrangian function constructed from the image domain magnitude and a penalty function which is based on the choice of aperture. As a general Larangian, we consider two types of terms, the squared magnitude of the output image, and a penalty function, that represents the best estimate of the leakage energy of a given aperture. Given N points of uniform data, a very general physically motivated Lagrangian density can be written as, $$\mathcal{L}(j) = \left(\sum_{i=1}^{N} w_i(j) g_i\right)^2 + a^2 f(w_1(j), \ldots w_N(j)), \quad (1)$$

where $g_i$ are the sampled image domain points, indexed with a unique number running from $1 \ldots N$. The coefficients $\omega_i$ are the coefficients of an image domain filter. The second term in the Lagrangian of equation (1) represents an estimate of the leakage energy associate with the filter described by the coefficients $\omega_1$ through $\omega_N$. Some techniques for estimating the leakage energy will be discussed in detail below. The index j runs over all the points in the image domain ($1 \ldots N$), and the dependence of the coefficients $\omega_i$ on j represents the fact that the apertures are allowed to vary in the image domain. The coefficient $\alpha$ is a real valued coupling constant and typically is set to a value on the order of one. The imaginary and complex parts of the data can either be independently projected out and incorporated into independent Lagrangians, or the squaring in equation (1) can be understood as a norm squared operator. Both techniques merit investigation.

SVA can be understood in the context of the minimization of this generalized Lagrangian. In SVA, the frequency domain weighting functions are restricted to the cosine on pedestal family of functions. Furthermore, the coefficients of the cosine functions are restricted to the range 0 to 1. Symbolically, in one dimension, these constraints can be written as, $$W_i(j) = \delta_{ij} + w(\delta_{i-1,j} + \delta_{i+1,j}), \quad (2)$$

with, $$0 \leq w \leq 1. \quad (3)$$

SVA is recovered by setting the coupling coefficient, $\alpha$ to zero, and minimizing the Lagrangian in equation (1) subject to the aperture function constraints in equations (2) and (3).

The nonanalyticity of the constraint in equation (3) leads to a number of theoretical and practical problems. The nonanalytic impulse response of SVA sometimes makes theoretical analysis difficult, and can introduce pseudorandom artifacts in the final image (such as a "fog" that sometimes appears in shadows near bright scatterers) in both apodization and super resolution applications.

In LEM, there is no need to introduce nonanalytic constraints. In fact constraints on the parameters $\omega_i$ need only be introduced for computational efficiency, to preserve symmetries of the system, or to ensure that the desired signal is passed with unit gain. As a result of the absence of these nonanalytic constraints, the output from a LEM implementation will be an analytic function of the input image. In most applications, we wish to preserve the parity (reflection) symmetry of the system through the constraint, $$\omega_{j+k}(j) = W_{j-k}(j) \quad (4)$$

which restricts the allowed weighting functions to the class of even functions. Typically, we restrict ourselves to analytic, holonomic constraints. A holonomic constraint is one that can be written in the form $g(\omega_1, \ldots, w_N) = 0$, for some function $g(\omega_1, \ldots, \omega_N)$. Such functions can often be enforced through a trivial substitution into the original Lagrangian.

The choice for sidelobe energy penalty function, $f(\omega_1(j), \ldots \omega_N(j))$, is motivated by the theoretical properties of the chosen windows. For apodization applications, we have found the integrated sidelobe energy level to be a useful potential, that is, if the continuous image domain impulse response function of the aperture is given by the function $I(\omega_1, \ldots, \omega_N; \chi)$, the potential is given by the expression, $$f(w_1, \ldots; w_N) = (g_0)^2 \left[ \int_{-\infty}^{1} + \int_{1}^{\infty} I(w_1, \ldots; w_N; x)^2 \, dx \right], \quad (5)$$

where $g_0$ is a scale setting factor, typically normalized to the output of the spatially varying filter evaluated at the minimum of equation (5). In other words, $g_0$ at any given point is the output of the aperture with minimum sidelobe energy.

The integration in equation (5) is over a known analytic function and is trivial to perform numerically (and, in many cases, analytically in terms of well known special functions). The potential described by equation (5) is an estimate of the total energy in the sidelobe of a scatterer at the given point. As the case in many other spatially variant schemes, we impose the normalization constraint $I(\omega_1, \ldots, \omega_N; 0) = 1$, as an attempt to ensure that an isolated point is passed with unit gain.

An alternative criterion to the one in equation (5) is to keep the normalization constraint $I(\omega_1, \ldots, \omega_N; 0) = 1$, but to minimize the total energy. This condition is described by the integral, $$f(w_1, \ldots, w_N) = (g_0)^2 \int_{-\infty}^{\infty} I(w_1, \ldots, w_N; x)^2 \, dx, \quad (6)$$

which represents an estimate of the total energy in the image domain due to a given point scatterer. Typically, this integral can be easily calculated in the frequency domain using Parseval's theorem. This potential does not discriminate between sidelobe and mainlobe energy and will decrease the mainlobe width. Unfortunately, it is not as aggressive in lowering the sidelobes as the potential in equation (5). Potentials of this form are promising in super resolution applications.

Once the potential is known, the LEM output can be calculated in one of two ways. For a simple potential, the minimum of the Lagrangian can be found as an analytical function of the input unweighted image. This minimum can then be calculated at every point in the image domain. For more complicated potentials, the Lagrangian can be minimized numerically. This proves to be a fairly simple task, since every term in the Lagrangian is local in the image domain.

In summary, the steps to implement a LEM based apodization algorithm are as follows:

Choose and parameterize a set of computationally efficient aperture functions.

Impose holonomic constraints to enforce symmetries and normalization conditions.

Construct a potential that provides an estimate of the leakage energy as a function of the aperture parameters.

At every sampled point in the image domain, calculate the values of the aperture parameters that minimize the Lagrangian in equation (1).

The LEM output at any point is given by the output of the optimized aperture.

The following section describes some particular implementations in one and two dimensions. For a simple implementation, consider the FIR filter defined by the symmetric convolution of the nearest neighbors in one dimension, $$g'(j) = \omega_0(j)g(j) + \omega_1(j)(g(j+1) + g(j-1)), \quad (7)$$

where $\omega_0(j)$ and $\omega_1(j)$ are two functions that parameterize the weighting function. We restrict $\omega_0(j)$ and $\omega_1(j)$ to be real valued. In the frequency domain, the weighting functions described in equation (7) are given by the family of functions, $$W(k) = \omega_0 + \omega_1 \cos(\pi k / f_0), \quad (8)$$

where the frequency domain support of the data is confined to the region $-f_0 \leq k \leq f_0$. The IPR, in natural units, is given by the expression, $$I(x) = \frac{1}{2\pi f_0} \int_{-f_0}^{f_0} [w_0 + w_1 \cos(\pi k / f_0)] \cos(kx / f_0) \, dk \quad (9)$$

$$= \text{sinc}(\pi x) + \frac{w_1}{2} [\text{sinc}(\pi(x+1)) + \text{sinc}(\pi(x-1))], \quad (10)$$

For data sampled at s times the Nyquist frequency, the normalization constraint reads, $$w_0(j) + w_1(j)\frac{s}{\pi}\sin(\pi/s) = 1. \quad (11)$$

For clarity, we will develop an implementation based on Nyquist sampled data, where equation (7) describes the cosine on pedestal family of weighting functions and (as in the case of SVA), the normalization constrain reduces to $$\omega_0(j)=1. \quad (12)$$

However, it should be clear that this formalism could just as easily be implemented on arbitrarily sampled data.

The potential term associated with the leakage energy is found by integrating over the estimated sidelobe power, $$f(w_1) = 2g_0^2 \int_1^\infty \left[\text{sinc}(\pi x) + \frac{w_1}{2}(\text{sinc}(\pi(x+1)) + \text{sinc}(\pi(x-1)))\right]^2 dx \quad (13)$$

The integral in equation (13) can be easily done numerically, or expressed analytically in terms of sine integral functions. Numerically, $$f(w_1) = g_0^2(0.0971767 - 0.31555w_1 + 0.31403w_1^2) \quad (14)$$

The potential in equation (14) is a quadratic penalty that describes an aversion to apertures as $\omega_1 \to \pm\infty$ (see plot in FIG. 1). The minimum of the potential is located at $\omega_1=0.462138$, which corresponds to a moderate cosine on pedestal weighting function. The potential is very flat near the minimum, and gradually eases into a steep quadratic at the edges of the canonical cosine on pedestal region. Therefore the parameter $\omega_1$ is free to traverse this central region with little penalty, but there is small probability that the minimum of the Lagrangian will lie far outside of the region $0 \leq \omega_1 \leq 1$.

The resulting Lagrangian is, $$\mathcal{L}(j) = \left[g(j) + \frac{w_1(j)}{2}(g(j+1) + g(j-1))\right]^2 + \\ a^2 g_0^2(0.0971767 - 0.31555w_1 + 0.31403w_1^2) \quad (15)$$

LEM may be implemented by numerically minimizing the Lagrangian in equation (15) at every point in the image domain space. Because the Lagrangian is a simple polynomial in $\omega_1$, even the simplest minimization algorithms can obtain reasonable convergence in few iterations. The minimum can also be found analytically by solving for the root of the differential, $$w_1 = \frac{-g_0(j)(g(j+) + g(j-1)) + 0.1578g_0(j)^2 a^2}{(g(j+1) + g(j-1))^2 + 0.3414g_0^2 a^2} \quad (16)$$

The corresponding optimized output is a simple ratio of low order polynomials, $$g'(j) = a^2 g_0(j)^2 \frac{g_0(j) + 0.4621(g(j+1) + g(j-1))}{a^2 g_0(j)^2 + 2.9291(g(j+1) + g(j-1))^2} \quad (17)$$

Figure 2:
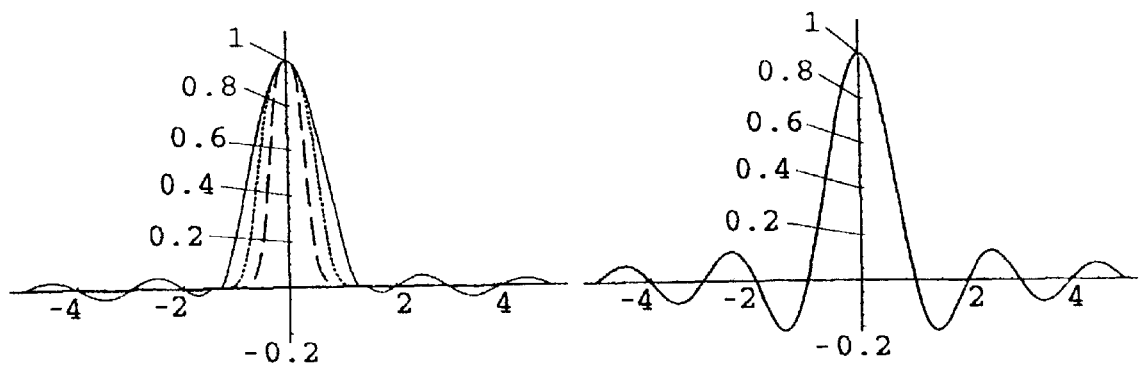
FIG. 2 illustrates how a coupling coefficient may be varied to control the tradeoff between sidelobe level and model dependence.

Unlike SVA, the LEM output, g'(j) is a purely analytic function of the input image. The coupling coefficient, $\alpha$, can be varied to control the trade off between sidelobe level and model dependence. The impulse response for three values of $\alpha$ are plotted in FIG. 2.

We have observed that an iterative procedure can improve the mainlobe sharpness. The output, g'(j), can be used instead of $g_0(j)$ in the second iteration.

The general procedure is clear from this one dimensional, one parameter example. In other applications (such as two dimensional imagery), a more complicated Lagrangian is constructed, but the principles involved in the minimization are the same. In practice, the minimization of such a Lagrangian can prove technically challenging. We have written C++ implementations of the LEM minimization on SIO files using three different methods:

For simple, quadratic Lagrangians (as in the example above) the minimum can be found as an analytic function of the input image, and evaluated at each point.

For more complicated quadratic Lagrangians, the minimum is found by solving a system of N linear equations (the N equations represent the partial derivatives with respect to each parameter). This linear system can be written in matrix form, and the matrix of coefficients can be evaluated numerically at each point. The resulting set of linear equations can be solved numerically by means of an LU decomposition.

For complicated Lagrangians, a numerical optimization has to be done at every point. While the Lagrangians are typically quick to converge, this process can be quite CPU time consuming.

In two dimensions, a logical parameterization involves combinations of the eight nearest neighbors (two horizontal, two vertical, and four diagonal). On Nyquist sampled data, the frequency domain weightings can be parameterized as, $$W(k_x, k_y) = 1 + \omega_x \cos(\pi k_x/f_o) + \omega_y \cos(\pi k_y/f_o) + \omega_{xy} \cos(\pi k_x/f_o) \cos(\pi k_y/f_o). \quad (18)$$

which are implemented in the image domain as a 3×3 matrix convolver, $$g'(j) = g(j) + \omega_x(j)P_x(j) + \omega_y(j)P_y(j) + \omega_{xy}(j)Q(j), \quad (19)$$

where the $P_x(j)$ is the average of the nearest neighbors in the x direction, $P_y(j)$ is the average of the nearest neighbors in the y direction, and Q(j) is the average of the four diagonal neighbors.

A useful potential can be constructed by integrating sidelobe intensity in the image domain outside of the square region defined by $-1 \leq x \leq 1$ and $-1 \leq y \leq 1$. The potential and analytic output are described in detail below.

The output of this two dimensional procedure can be controlled by the parameter $\alpha$, which regulates a trade off between contrast in the clutter region, and sidelobes/resolution. When the coupling constant is tuned so that the contrast is equivalent to that of SVA, the resolution in the regions with several bright scatterers is greatly improved over SVA, and there is less of a general "haze" in these regions.

Some super resolution can be achieved by pushing the coupling coefficient down to small enough values. However, the price in degradation in the busier regions of the image is very high. Super resolution will probably be easier if Lagrangian with a larger number of parameters is used. Additionally, we have noticed resolution improvement when the potential is constructed from the total integrated intensity instead of only the sidelobe intensity. However, these potentials tend to do a poor job at apodization.

One Dimension Potential

The integral in equation (13) is easiest to perform by breaking it into the difference of two integrals. The first integral runs over the entire region $-\infty \leq x \leq \infty$, while the second integrals runs over the region $-1 \leq x \leq 1$, $$f(w_1) = \int_{\infty}^{\infty} I(w_1;x)^2 \, dx - \int_{-1}^{1} I(w_1;x)^2 \, dx \qquad (20)$$
$$\equiv f_a(w_1) + f_b(w_1)$$

The first integral is can be done in the frequency domain by means of Parseval's theorem, which states that the integrated intensity of the coefficients is the same in either domain. The first integral is then, $$\left(f_a(w_1) = \frac{1}{2\pi} \int_{-\infty}^{\infty} [1 + w_1 \cos(\pi k/f_0))]^2 \, dk_x \, dk_y \right. \qquad (21)$$
$$= 1 + \frac{1}{2} w_1^2 \qquad (22)$$

The second integral can be expressed in terms of sine integrals, $$f_b(w_1) = \frac{1}{2\pi} [8\pi \mathrm{Si}(2\pi) + 4w_1(\gamma - \mathrm{Ci}(2\pi) + \log(4\pi)) - \qquad (23)$$
$$w_1^2(\gamma - \mathrm{Ci}(4\pi) + \log(4\pi) - 2\pi \mathrm{Si}(4\pi))],$$

where $\gamma$ represents Euler's constant, and Si and Ci are the sine and cosine integral functions, respectively. Numerically, the sum of $f_a(\omega_1)$ and $f_b(\omega_1)$ reproduces equation (14).

Two Dimensional Potential

In the previous section we discussed a two dimensional extension of the one dimensional minimum sidelobe energy model. The potential for this model is found by integrating the intensity over the region of the image domain outside of the central square with twice unit sides. The answer can be expressed analytically using similar techniques as those used in the one dimensional case. Numerically, $$f(\omega_x, \omega_y, \omega_{xy}) = 0.18491 + 0.35682 w_x^2 + 0.35682 w_y^2 + 0.22485 w_{xy}^2 - 0.049786 \omega_x \omega_y - 0.050045 \omega_x \omega_{xy} - 0.050045 \omega_y \omega_{xy} - 0.28489 \omega_x - 0.28489 \omega_y - 0.049786 \omega_{xy} \qquad (24)$$

The minimum of the potential is the point, $$(\omega_x, \omega_y, \omega_{xy}) \to (0.44496, 0.44496, 0.20975). \qquad (25)$$

The minimum of the Lagrangian can be found analytically and used to compute the LEM output point by point in the image domain.

Alternatively, we can construct a set of linear equations that describe the minimum from the extremum condition, $\partial L/\partial \omega_i = 0$ for the three $\omega_i$ parameters. In matrix form, we denote the parameter vector by $w \equiv (\omega_x, \omega_y, \omega_{xy})^T$. The extremum is described by, $$Aw + B = 0 \qquad (26)$$

where the matrix A is found from differentiating the Lagrangian, $$A_{ij} = \frac{\partial^2 \mathcal{L}}{\partial w_i \partial w_j}, \qquad (27)$$

and the vector B is defined by, $$\left(B_i = \frac{\partial \mathcal{L}}{\partial w_i}\right)\bigg|_{w_x=0, w_y=0, w_{xy}=0} \qquad (28)$$

Analytic expressions can be found for A and B on a point by point basis, and the set of linear equations can be solved through an LU decomposition.

I claim:

1. A method of minimizing sidelobe energy in a synthetic aperture radar (SAR) or other Fourier imaging process, comprising the steps of:
   providing remote-sensing means to generate image domain data having a magnitude and phase;
   constructing a Lagrangian function based upon the magnitude of the data under varying aperture weighting functions;
   introducing a penalty function based upon the frequency domain support of the data;
   minimizing the Lagrangian function in conjunction with the penalty function;
   choosing an aperture weighting function based upon the minimum of the constructed Lagrangian function; and
   utilizing the results of the method in a SAR or other Fourier imaging system.

2. The method of claim 1, wherein the Lagrangian function takes the form:

$$\mathcal{L}(j) = \left(\sum_{i=1}^{N} w_i(j) g_i\right)^2 + a^2 f(w_1(j), \ldots w_N(j)),$$

where:
   $g_i$ are the sampled image domain points indexed with a unique number running from $1 \ldots N$,
   $\omega_i$ are the coefficients of an image domain filter, and
   $a^2 f(\omega_1(j), \ldots \omega_N(j))$ is an estimate of the leakage energy associated with the filter described by the coefficients $\omega_i$ through $\omega_N$, with a being a real valued coupling constant.

3. The method of claim 2, wherein the real and imaginary parts of the Lagrangian function are evaluated separately.

4. The method of claim 1, further including the step of preserving reflection symmetry of through the constraint:

$$\omega_{j+k}(j) = \omega_{j-k}(j),$$

which restricts the allowed weighting functions to even functions.

5. The method of claim 1, wherein the step of choosing the penalty function is based upon an estimate of the total energy in the sidelobe of a scatterer at a given point.

6. The method of claim 5, wherein the penalty function is given by:

$$f(w_1, \ldots; w_N) = (g_0)^2 \left[ \int_{-\infty}^{1} + \int_{1}^{\infty} I(w_1, \ldots; w_N; x)^2 \, dx \right].$$

7. The method of claim 5, wherein the step of choosing the penalty function keeps the normalization constraint $I(w) = 1$ while minimizing the total energy.

8. The method of claim 7, wherein the penalty function is given by:

$$f(w_1, \ldots, w_N) = (g_0)^2 \int_{-\infty}^{\infty} I(w_1, \ldots, w_N; x)^2 \, dx.$$

9. The method of claim 1, wherein the step of minimizing the Lagrangian function in conjunction with the penalty function includes calculating the minimum at each point in the image domain.

10. The method of claim 1, wherein the step of minimizing the Lagranzian function in conjunction with the penalty function includes the step of solving a set of simultaneous linear equations.

11. The method of claim 1, wherein the step of minimizing the Lagrangian function in conjunction with the penalty function includes the step of performing a numerical optimization.

12. The method of claim 1, wherein the steps are used in conjunction with a super-resolution application.

13. The method of claim 1, wherein the steps are used in conjunction with a gap-filling application.

14. The method of claim 1, wherein the steps are used in conjunction with a interferometry application.

15. The method of claim 1, wherein the steps are used in conjunction with an ATR application.

16. The method of claim 1, wherein the steps are used in conjunction with an ultrasonic imaging application.

17. The method of claim 1, wherein the steps are used in conjunction with any Fourier imaging application.

18. A method of minimizing sidelobe energy in a synthetic aperture radar (SAR) or other Fourier imaging process, comprising the steps of:

providing remote-sensing means to generate image domain data having a magnitude and phase;

choosing and parameterizing a set of aperture functions;

imposing holonomic constraints on the set of aperture function to enforce symmetries and normalization conditions;

constructing a penalty function potential that provides an estimate of leakage energy as a function of the aperture parameters;

at every sampled point in the image domain data, calculating the values of the aperture parameters that minimize the Lagrangian equation;

at every sampled point in the image domain, weighing the output with the aperture corresponding to the minimum of the Lagrangian for that sampler; and utilizing the results of the method in a SAR or other Fourier imaging system.

19. The method of claim 18, wherein the step of minimizing the Lagrangian function in conjunction with the penalty function includes calculating the minimum at each point in the image domain.

20. The method of claim 18, wherein the step of minimizing the Lagrangian function in conjunction with the penalty function includes the step of solving a set of simultaneous linear equations.

21. The method of claim 18, wherein the step of minimizing the Lagrangian function in conjunction with the penalty function includes the step of performing a numerical optimization.

* * * * *

UNITED STATES PATENT AND TRADEMARK OFFICE
CERTIFICATE OF CORRECTION

PATENT NO. : 6,111,535
DATED : Aug. 29, 2000
INVENTOR(S) : Brian H. Smith

It is certified that error appears in the above-identified patent and that said Letters Patent are hereby corrected as shown below:

Column 8, line 30 - Before "method" insert --other--.

Column 8, line 30 - After "method" insert --steps above--.

Column 8, line 50 - Replace "of through" with --using--.

Column 9, line 12 - Replace "Lagranzian" with --Lagrangian--.

Column 10, line 12 - Replace "the" with --a--.

Column 10, line 12 - Delete "eguation" and insert --function of an image domain magnitude and a penalty function--.

Column 10, line 17 - Replace "method" with --other method steps above--.

Signed and Sealed this

Fifteenth Day of May, 2001

*Attest:*

NICHOLAS P. GODICI

*Attesting Officer*       *Acting Director of the United States Patent and Trademark Office*